US006208477B1

(12) United States Patent
Cloke et al.

(10) Patent No.: US 6,208,477 B1
(45) Date of Patent: *Mar. 27, 2001

(54) HARD DISK DRIVE HAVING A BUILT-IN SELF-TEST FOR MEASURING NON-LINEAR SIGNAL DISTORTION

(75) Inventors: Robert Leslie Cloke, Santa Clara; Patrick James Lee, San Jose, both of CA (US)

(73) Assignee: Western Digital Corporation, Irvine, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/870,515

(22) Filed: Jun. 6, 1997

(51) Int. Cl.$^7$ .............................. G11B 27/36; G11B 5/02; G11B 5/09
(52) U.S. Cl. ............................... 360/31; 360/25; 360/46; 360/53
(58) Field of Search ................................. 360/31, 46, 51, 360/53, 65, 25; 364/468.03, 717.01

(56) References Cited

U.S. PATENT DOCUMENTS

| | | | | |
|---|---|---|---|---|
| 3,614,623 | * | 10/1971 | McAuliffe | 352/42 |
| 4,400,790 | * | 8/1983 | Chambers et al. | 364/604 |
| 5,117,291 | * | 5/1992 | Fadavi-Ardekani | 358/167 |
| 5,737,342 | * | 4/1998 | Ziperovich | 371/25.1 |
| 5,872,664 | * | 2/1999 | Meier | 360/31 |

OTHER PUBLICATIONS

"Identification of Nonlinear Write Effects Using Pseudorandom Sequences," by Dean Palmer, Palblo Zipervocich, Roger Wood, and Thomas D. Howell; IEEE Transactions On Magnetics, vol. MAG–23, No. 5, Sep. 1987, pp. 2377–2379.

Test and Measurement Committee PRML Working Group Working Paper, "Nonlinear Distortion Measurement Techniques," by Don Adams, et al., IDEMA, Sep. 1995, pp. 1–50.

\* cited by examiner

Primary Examiner—Nabil Hindi
Assistant Examiner—Regina Y. Neal
(74) Attorney, Agent, or Firm—Milad G. Shara

(57) ABSTRACT

In a hard disk drive, a semiconductor chip includes a circuit used in a built-in self test ("BIST") to determine an amplitude of a dibit echo for characterizing nonlinear distortion of a readback signal. Preferably, write precompensation is performed based on results of the BIST to minimize distortion attributable to intersymbol interference. A generator is used to generate a maximal length pseudo-random sequence. This maximal length pseudo-random sequence is input to a correlator which performs a correlation between the maximal length pseudo-random bit sequence and a readback signal responsive to the pseudo-random sequence that was stored onto a disk of the hard disk drive. In one embodiment, a seed value stored in memory is loaded into the generator upon detection of a synchronization signal read from the disk. With the appropriate seed value loaded into the generator, a specific pseudo-random bit sequence corresponding to a sample point of interest is then generated. The cross-correlation between this specific pseudo-random sequence with the readback signal produces a sample point corresponding to the dibit echo. By iteratively generating sample points corresponding to the echo, the peak amplitude of that dibit echo can be accurately estimated. The magnitude of the peak amplitude of the dibit echo is then used to characterize the nonlinear intersymbol interference, which in turn, can be used to perform write precompensation as well as other functions. With this semiconductor chip, a hard disk drive can accurately characterize nonlinear intersymbol interference in the field as part of a built-in self-test function.

14 Claims, 8 Drawing Sheets

HARD DISK DRIVE HAVING A BUILT-IN SELF-TEST FOR MEASURING NON-LINEAR SIGNAL DISTORTION

BACKGROUND OF THE INVENTION

1. Field of the Invention

This invention relates to a hard disk drive that provides a built-in self test ("BIST") for measuring readback signal distortion attributable to certain sources including intersymbol interference ("ISI").

2. Description of the Prior Art

A huge market exists for hard disk drives for mass-market computer systems ("hosts") such as servers, desktop computers, and laptop computers. To be competitive in this market, a hard disk drive must be relatively inexpensive, and must accordingly embody a design that is adapted for low-cost mass production. In addition, it must provide substantial capacity, rapid access to data, and reliable performance. Numerous manufacturers compete in this huge market and collectively conduct substantial research and development, at great annual cost, to design and develop innovative hard disk drives to meet increasingly demanding customer requirements.

Each of numerous contemporary mass-market hard disk drive models provides relatively large capacity, often in excess of 1 gigabyte per drive. Nevertheless, there exists substantial competitive pressure to develop mass-market hard disk drives having even higher capacities.

Satisfying these competing constraints of low-cost and high capacity requires a design that provides high areal storage density. Areal storage density relates to the amount of data storage capacity per unit of area on the recording surfaces of the disks. The available areal density may be determined from the product of the track density measured radially and the linear bit density measured along the tracks.

The available linear bit density depends on numerous factors including the performance capability of the transducer heads, the media, and certain circuitry that is commonly referred to as a "read channel. "One type of read channel is referred to as a peak-detecting channel; another type is referred to as a sampled-data channel. The type referred to as a sampled-data channel is a category including a partial response, maximum likelihood ("PRML") channel, a EPR4 channel, and a E$^2$PR4 channel.

In a hard disk drive having any of these read channels, the read channel receives an analog read signal from a head during a read operation. The analog read signal is characterized by a "channel frequency." As used in this art, "channel frequency" is the reciprocal of a time period "T," where the "T" is the time period consumed while an elemental-length magnet passes under the transducer during a read operation with the disk spinning at a constant angular velocity. In this regard, the length of each magnet recorded along a track as a result of a write operation is, to a first order of approximation, either an elemental length or an integer multiple of the elemental length. Each elemental length magnet can be referred to as a "bit cell" that is defined during a write operation.

In a hard disk drive employing a peak detecting channel, digital data are represented in the media by transitions between oppositely magnetized bit cells. Provided that the transitions between oppositely magnetized bit cells do not unduly interfere with each other, each such transition causes a peak in the analog read signal, and a peak-detecting channel employs a peak detector that detects such peaks, and produces digital signal in the form of a serial, binary-valued signal. Interference between adjacent transitions referred to as ISI has a relatively high adverse effect on performance of a peak detecting channel, particularly in the environment of a relatively high channel rate.

A sampled-data channel employs sampling circuitry that processes an analog read signal to produce a sequence of digital samples. The digital samples so produced are supplied in sequence to a detector such as a so-called 'Viterbi detector" that internally produces symbols and maps the internally-produced symbols to binary-valued symbols. In a PRML channel, such internally-produced symbols are often referred to as: "−1"; "0"; and "+1"; and the binary-valued symbols are supplied to a deserializer to produce a parallel-by-bit digital signal.

The analog read signal contains random noise, and otherwise departs from ideal as a result of numerous effects such as ISI. A paper containing useful background information concerning such distortions has been authored by Palmer, D and Ziperovich, P., and is titled *Identification Of Nonlinear Write Effects Using Pseudorandom Sequences*, IEEE Transactions On Magnetics, Vol. Mag-23, No. 5, September 1987, pp 2377–2379 (the "Palmer paper"). The Palmer paper discusses linear and nonlinear distortions that occur in read channels, and describes a technique for separating linear and nonlinear effects, based on the unique properties of a type of codeword referred to as a maximal-length psuedorandom sequence (a "PN sequence") of data.

The Palmer paper sets forth the following description of an experimental procedure for carrying out the disclosed technique for measuring nonlinear distortion separately from linear distortion:

"Several tracks around the test track are AC-erased by writing with a short-wavelength constant-frequency pattern. A maximal-length 63 bit pseudorandom sequence is written over the selected overwrite condition. A complete period of the readback waveform is captured and averaged with a digitizing oscilloscope. The Fourier transform of the readback waveform is divided by the transform of the discrete-time pseudorandom sequence to obtain the channel transfer function. The inverse transform yields a time domain response which in the absence of nonlinear distortion would be a simple dipulse. However, for a channel with nonlinerities there are a number of smaller perturbations or echoes on either side of the main dipulse . . . . By determining which echoes are present and measuring the amplitudes relative to the main dipulse, the physical mechanisms can be inferred and quantified. The same result can be obtained by a least-squares method."

Another paper containing useful background information is titled *Nonlinear Distortion Measurement Techniques*, Partial Response Maximum Likelihood (PRML) Working Group of the International Disk Drive Equipment and Materials Association (IDEMA), September, 1995. (the "IDEMA Working paper"). A copy of the IDEMA Working paper is being submitted as part of the prosecution history hereof. One section of the IDEMA paper concerns a technique referred to therein as "Dipulse Extraction." The IDEMA paper sets forth the following 11-step procedure for performing the dipulse extraction measurement:

"1) Select a maximal length pseudorandom bit sequence (PRBS).

2) Record several consecutive repetitions of the PRBS on the disk.

3) Using a digital oscilloscope capture and instantaneous average more than one period of the playback waveform.

4) Download the digitized waveform to a computer.
5) In the computer resample the waveform so that there are N samples per bit, where N is an integer. A typical value of N is 8 or 10.
6) Calculate the discrete Fourier Transform of exactly one period of the digitized and resampled PRBS playback waveform.
7) Create an oversampled version of the PRBS in which (N−1) zeros are inserted between each bit of the original PRBS.
8) Calculate the discrete Fourier Transform (DFT) of the oversampled PRBS.
9) Divide the DFT of the waveform by the DFT of the oversampled PRBS and take the inverse DFT of the result. The result is composed of a dipulse and several smaller, shifted dipulse responses which are referred to as echoes.
10) (optional) Circularly rotate the result of step 9 so that the dipulse is centered. Refer to the center as time zero.
11) Measure the ratio of the amplitudes of the main pulse to the various echoes. Each ratio indicates the amount of nonlinearity present in the recording system."

The procedures described in the Palmer paper and in the IDEMA paper have limited practical application (e.g., in an engineering laboratory), but are too complex, time-consuming, and labor-intensive for practical application in unit-by-unit testing of disk drives in mass production manufacturing.

Both the Palmer paper and the IDEMA paper describe measurement procedures involving calculation of Fourier transforms and inverse Fourier transforms. An alternative prior art approach (that on an overall basis likewise has practical application limited to engineering laboratory testing) involves calculation of and plotting a set of cross-correlation values, each of which is identified by an abbreviation herein as "$r_{px}(k)$." Each cross-correlation value is determined by cross-correlating the readback signal and a discretely time-shifted replica of the PN sequence that had been written on the disk and then read out to produce the readback signal. As an example of this, Prior art FIG. 1 is a graph showing a plot 201 that is referred to herein interchangeably as a dibit extraction plot or dipulse extraction plot. In this graph, the abscissa or "X" axis represents the discrete time shifts of the reference PN sequence, and the ordinate or "Y" axis represents the magnitude of the cross-correlation values $r_{px}(k)$. In Prior art FIG. 1, there are 127 cross-correlation values $r_{px}(k)$ spread across the abscissa in a range of discrete time shifts (measured in bits) from between −63 bits to 0 to +63 bits.

Dibit waveform 201 has a main dibit 202 representing the linear response and a set of smaller peaks or "echoes" 203–205. Echo 203 is attributable to an overwrite, whereas echoes 204 and 205 are attributable to and proportional to the amount of one-bit and two-bit nonlinear timing shift that is present in the system. In other words, a larger echo amplitude corresponds to more nonlinear ISI that is present in the system; the echoes would not exist in a totally linear system. Consequently, the degree of nonlinear ISI can be characterized by determining the amplitudes of the echo(s) or their respective areas. Furthermore, this characterization of nonlinear ISI includes nonlinear timing shifts as well as the nonlinear effects which depend on the proximity of adjacent magnetic transitions.

None of the above-described or other prior art techniques for measuring nonlinear readback signal distortion lend themselves to practical application in unit-by-unit testing of disk drives in mass production manufacturing.

Thus, there is a need for a way to provide for accurate, inexpensive, and efficient measurement of readback signal distortion.

SUMMARY OF THE INVENTION

This invention can be regarded as a hard disk drive that provides a built-in self-test for measuring distortion of a readback signal. The hard disk drive comprises a disk, and head and read channel means. The combination of disks and head and read channel means (particularly the heads) is subject to significant unit-to-unit variation in the mass production of hard disk drives, and a need exists for low-cost, effective testing of this combination on a unit-by-unit basis.

The disk has a recording surface storing a recorded block including a recorded string of bits defining a first phase of a maximal length pseudo-random sequence generated by a predetermined polynomial. The head and read channel means produce the readback signal responsive to the recorded block. The disk drive also includes circuit means operative during the self test including signal-generating means and a correlator. The signal-generating means generate a reference signal having a sequential block including a sequential string of bits defining a second phase of the maximal length pseudo-random sequence. The correlator responds to the readback signal and the reference signal for producing a cross-correlation value.

Preferably, the recorded block includes multiple recorded strings, the sequential block includes multiple sequential strings, multiple phase differences exist between the recorded strings and the sequential strings, and the correlator produces multiple cross-correlation values. Whereas prior art procedures that have limited application such as in an engineering laboratory typically involve determining a large number of points for a dipulse extraction plot, a preferred embodiment of this invention involves producing a relatively small number of cross-correlation values.

By iteratively producing cross-correlation values corresponding to the predicted location of a dibit echo, its shape and amplitude can be accurately estimated. By thusly measuring one or more dibit echoes, one can accurately characterize the nonlinear distortion of the readback signal that is primarily attributable to intersymbol interference. Based on this information, a number of different techniques, such as write precompensation, can be effectively utilized. Furthermore, with practice of this invention, nonlinear distortion attributable to causes such as intersymbol interference can be effectively characterized and measured in the field as part of a built-in self-test, without the need for any external test or evaluation instrumentation.

Preferably, the signal-generating means includes a register for storing a seed value, and means responsive to the seed value for controlling the phase of the sequential string. Also preferably, the correlator includes a multiplier and an accumulator.

In accordance with a particularly advantageous and preferred feature, the head and channel means includes circuit means for producing an analog read signal, and circuit means including a sampler responsive to the analog read signal for producing a sampled signal, and wherein the correlator includes a multiplier responsive to the sampled signal. Also preferably, the hard disk drive also comprises a programmable microprocessor, and memory for storing a program, the microprocessor being responsive to the program to define a normal mode of operation and a built-in test mode of operation. In the preferred embodiment, the built-in test mode of operation includes a test-write phase and a test-read phase, the hard disk drive further including means operative during the test-write phase for causing the signal-generating means to generate a block that is written to the disk recording surface, and means operative during the read-test phase for causing the signal-generating means to generate a sequential block including multiple cycles of the maximal length pseudo-random sequence, the multiple cycles having multiple phases.

This invention can also be regarded as a semiconductor chip having a circuit for operating during a built-in self-test of a disk drive to measure nonlinear distortion of a readback signal through dibit extraction. The circuit comprises a register for storing a seed value; a generator for generating a maximal length pseudo-random sequence; the generator being responsive to the seed value to initiate the maximal length pseudo-random sequence at a phase corresponding to the seed value; and a correlator coupled to receive the readback signal and coupled to the generator for performing a cross-correlation between the readback signal and the pseudo-random sequence generated by the generator.

This invention can also be regarded as a method for mass producing hard disk drives in which a unit-by-unit built-in self test is conducted to measure distortion of a readback signal. The method comprising the steps of: initiating the built-in self-test for a selected hard disk drive; generating a maximal length pseudo-random sequence during a write phase of the built-in self-test; storing the pseudo-random sequence onto a disk of the hard disk drive; generating a readback signal responsive to the pseudo-random sequence stored on the disk; cross-correlating the readback signal with a representative pseudo-random sequence to determine an amplitude of a dibit echo; estimating a peak amplitude of the dibit echo; and performing write precompensation based on the peak amplitude of the dibit echo.

BRIEF DESCRIPTION OF THE DRAWINGS

Prior Art

DETAILED DESCRIPTION

Overview of Suitable System Environment

A hard disk drive embodying this invention suitably includes structure disclosed and claimed in a pending application Ser. No. 08/815,352, filed Mar. 10, 1997, titled "DISK DRIVE EMPLOYING READ ERROR TOLERANT SYNC MARK DETECTION" filed by Robert Cloke and assigned to the assignee of this invention, the disclosure of which is hereby incorporated by reference.

Figure 2:
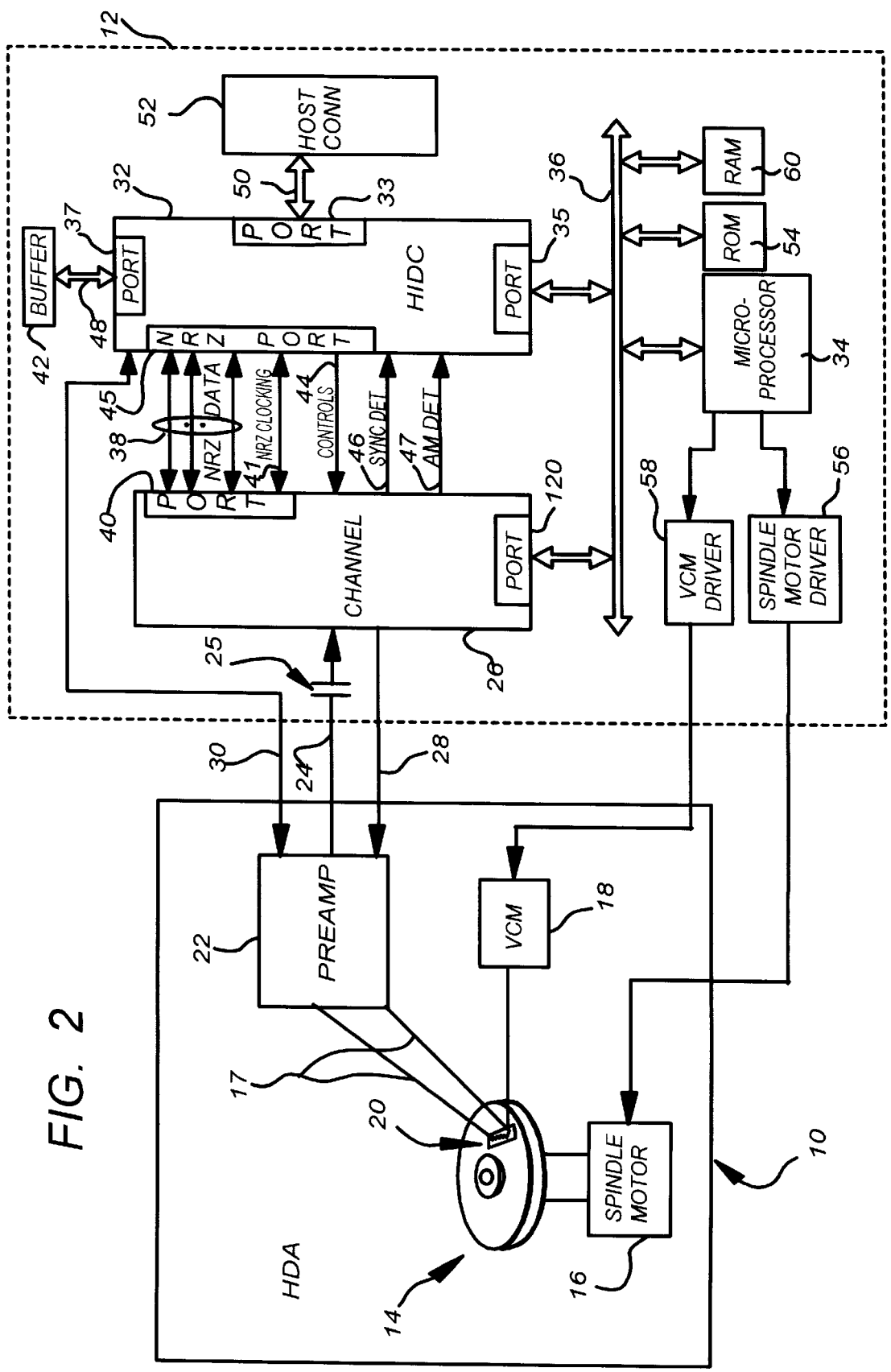
FIG. 2 is a block diagram of a hard disk drive embodying this invention.

With reference to FIG. 2, such a hard disk drive includes a head disk assembly ("HDA") 10 and a printed circuit board assembly ("PCBA") 12. HDA 10 includes a set of disks 14 having recording surfaces. HDA 10 also includes two motors, i.e., spindle motor 16 and voice coil motor ("VCM 18"). Spindle motor 16 is mechanically coupled to cause disks 14 to rotate. VCM 18 is part of a head positioning servo system that controls the position, relative to an adjacent recording surface, of a set of transducer heads such as head 20. Each head provides for reading and writing, and may be of any of various types including inductive thin film and MR type heads. HDA 10 also includes a preamp 22 coupled between the heads and PCBA 12.

Suitably, disks 14 provide four recording surfaces. When reading, each transducer 20 generates a low level analog read signal 17, which for inductive heads and many MR heads is a differential signal. Analog read signal 17 is conveyed to signal inputs of preamp 22. Preamp 22 produces a read signal 24 which is an amplified, differential, analog read signal. HDA 10 also includes a path for conveying read signal 24 to PCBA 12; a path for conveying a write data signal 28 to preamp 22; and a path for conveying preamp control signals 30 for preamp 22. Under control of control signals 30, preamp 22 operates in either a read mode or a write mode and in either case communicates with a selected transducer 20.

During a write operation, preamp 22 provides write current to a selected transducer 20; the write current changes polarity upon each change in binary value of write data signal 28. Read signals 17 and 24 have the same information content, and both are subject to various kinds of distortions including linear distortions and nonlinear distortions.

PCBA 12 includes a channel 26 and a host interface and disk controller ("HIDC 32"), each of which preferably is implemented as a single IC. Channel 26 provides, among other things, a signal processing path for processing read signal 24 to produce a clocked, serial-by-symbol data signal (i.e., a decoded binary data signal and accompanying clock signal). In this art, such a signal processing path that processes an analog read signal produced by a preamplifier to produce such a clocked serial-by-symbol data signal is commonly called a "read channel." Channel 26 also provides a signal processing path for processing a clocked serial-by-symbol data signal provided by HIDC 32 to produce a serial-by-bit data signal for the analog signal input of preamp 22. In this art, such an signal processing path is commonly referred to as a "write channel." The serial-by-symbol data signals propagate between channel 26 and HIDC 32 via a channel data bus 38. The clock signals for the serial-by-symbol data signals are shown collectively as NRZ CLOCKING 41 in FIG. 2.

Channel 26 is coupled to receive read signal 24 through a set of coupling capacitors 25 and has a port 40 connected via bus 38 to an NRZ port 45 in HIDC 32. Ports 40 and 45 and interconnecting bus 38 propagate data in a clocked, serial-by-symbol form referred to herein as non-return-to-zero (NRZ) form. The terms "NRZ" and "NRZI" (Non-Return to Zero Inverted) as used herein have their customary meaning in this art. That is, NRZ refers to a coding system in which a binary 1 is represented (at an instant in time indicated by a clock signal) by a 1st level or state and a binary 0 is represented (at an instant in time indicated by a clock signal) by a second level or state. NRZI refers to such a clocked coding system in which a binary 1 is represented by a transition from a 1st level or state to a second level or state and a binary 0 is represented by the absence of a transition.

Preferably, channel 26 supports use of a partial response, maximum likelihood (PRML) coding system. The term "PRML" as used herein refers to a type of signal processing employing sampled and equalized values of an input signal which are evaluated over several samples to estimate symbols contained in the input signal. PRML is one type of a broader class of signal processing systems referred to as "sampled-data processing systems."

HIDC 32 performs numerous control functions for the disk drive including host interface functions to manage transfer of data between the disk drive and the host, and certain disk controller functions to manage the operation of channel 26 in writing and reading data. Incident to such certain disk controller functions, HIDC 32 has circuitry for producing certain timing and control signals that are part of a set identified collectively as timing and control signals 44 which are sent between channel 26 and HIDC 32. As part of timing and control signals 44, HIDC 32 sends to channel 26 one of a set of signals collectively identified as write gate signal (WGATE) and one of a set of signals collectively identified as read gate signal (RGATE). In one embodiment, HIDC 32 sends to channel 26 as part of timing and control signals 44 one of a set of signals collectively identified as burst gate signal (BGATE), and one of a set of signal identified as AM ENABLE. In this embodiment, HIDC 32 includes sector timer circuits, and channel 26 sends a SYNC DET signal 46 and an AM DET signal 47 to HIDC 32 to synchronize the sector timer circuits. In an alternative embodiment, channel 26 includes sector timer circuits synchronized by SYNC DET signal 46 and AM DET signal 47, obviating the need to send these signals to HIDC 32. In the alternative embodiment, channel 26 internally produces BGATE and AM ENABLE, obviating the need for HIDC 32 to send a BGATE signal or an AM ENABLE signal to channel 26. In some systems, the "SYNC DET" signal is a particular data word conveyed via NRZ bus 38 rather than a binary-valued signal carried by a single line. These two implementations are functionally equivalent. In each case, the signal informs HIDC 32 that channel 26 has detected the sync word.

PCBA 12 also includes a data buffer 42, a microprocessor 34, a read only memory ("ROM 54"), a writeable random access memory ("RAM 60"), a VCM driver 58 for supplying current to VCM 18, and a spindle motor driver 56 for supplying current to spindle motor 16. PCBA 12 also includes a host interface bus 50 for conveying commands and data between HIDC 32 and the host, a microprocessor bus 36, a buffer bus 48 for conveying data between HIDC 32 and data buffer 42, and a path for conveying control signals 30 that provide for bidirectional control interactions between preamp 22 and HIDC 32.

Microprocessor 34 executes instructions acquired from a stored control program to control disk drive functions. These functions include reading and decoding host commands, starting up and controlling the speed of spindle motor 16, minimizing head-positioning servo off track error through control of VCM 18, managing reduced power modes of operation, and other disk drive functions. Microprocessor 34 includes an I/O port that is connected to microprocessor bus 36.

Microprocessor 34 suitably has separate ports for directly communicating with spindle motor driver 56 and VCM driver 58. Channel 26 has a port 120 and HIDC 32 has a port 35 that connect to microprocessor bus 36, whereby microprocessor 34 is capable of communicating directly with either IC via microprocessor bus 36. Microprocessor bus 36 also enables microprocessor 34 to communicate directly with ROM 54, and RAM 60. In alternate embodiments, spindle motor driver 56 and VCM driver 58 may be connected to a single port or to microprocessor bus 36.

Channel data bus 38 includes an 8-bit wide (byte-wide) parallel path; alternate embodiments may employ more or fewer parallel bits for channel data bus 38. Depending upon applicable data transfer requirements, a 4-bit wide (nibble-wide) path or even a serial-by-bit path may be suitable for channel data bus 38.

Preferably, channel 26 includes circuitry to accept write data from HIDC 32 via channel data bus 38 and port 40, to encode user write data for an appropriate RLL constraint and for partial response signaling precoding, and to produce write data signal 28 which is conveyed via preamp 22 to selected transducer 20. Preferably, during a write phase of a built-in self test, test-write data is written without such encoding. That is, a psuedorandom sequence generated as described more fully below is propagated directly to write circuitry, bypassing such RLL encoding and PR precoding circuitry.

Channel 26 also includes circuitry to process read signal 24, and generate decoded digital user data. The decoded digital user data are conveyed to HIDC 32 via port 40, channel data bus 38, and HIDC NRZ port 45.

In addition to HIDC NRZ port 45, HIDC 32 includes a buffer port 37 connected to buffer bus 48, and host interface port 33 connected to host-interface bus 50. HIDC 32 includes a buffer manager-arbitrator circuit that manages access to data buffer 42 and manages bi-directional exchange of data between HIDC 32 and data buffer 42 via buffer bus 48. Host interface port 33 provides for communicating with the host via host interface bus 50 and host connection 52. Suitably, host interface port 33 includes a set of ATA compatible host interface task file registers implemented as taught in the prior art. Both microprocessor 34 and other circuitry within HIDC 32 can read task file register contents. This preferred host interface port 33 also includes a set of host command registers and host data registers for parallel transfer of commands and data via host interface bus 50.

HIDC 32 also controls disk formatting and address translation. The translating of addresses includes translating a logical block address to a cylinder/head/sector address and provides for defect management. HIDC 32 also includes error detection and correction (EDAC) circuitry that is used to correct errors in user data that were read from disks 14 and stored in data buffer 42.

Data buffer 42 is implemented as random access memory such as a dynamic random access memory (DRAM) or a static random access memory (SRAM). Preferably, data buffer is implemented by at least one DRAM or SRAM IC that is a part of PCBA 12. In alternate embodiments, data buffer 42 and buffer bus 48 may be incorporated into HIDC 32. Data buffer 42 stores data recovered from a disk 14, data provided by the host that are to be recorded on a disk 14, and, optionally, disk drive commands, servo data and control programs for microprocessor 34. The buffer manager within HIDC 32 arbitrates access to data buffer 42 when contention for access to data buffer 42 occurs as consequence of various concurrent operations. Disk drive commands received from the host may be stored in data buffer 42 and be subsequently retrieved by microprocessor 34. Data buffer 42 preferably has sufficient capacity to hold multiple sectors of user data for both read and write operations; a suitable capacity is at least 64 KB and may be 512 KB or more where KB=1024 bytes.

ROM 54 is an optional conventional IC that stores at least part of the control program used by microprocessor 34. ROM 54 may be omitted in an embodiment in which microprocessor 34 includes embedded ROM suitable for replacing the functions of ROM 54.

RAM 60 is an optional, conventional RAM IC used to enlarge the high speed writeable memory available to microprocessor 34. RAM 60 is included in PCBA 12 when microprocessor 34 lacks sufficient internal RAM, and data buffer 42 cannot provide microprocessor 34 sufficient external storage or sufficiently fast external storage.

The host may be any electronic device that has an input/output (I/O) bus and interface connection means that is compatible with host connection 52, host interface bus 50 and host interface port 33. For example, the host may be a personal computer that includes an AT bus which has become a de facto standard for IBM PC compatible computer systems and is referred to as the Industry Standard Architecture (ISA). A higher speed Enhanced AT bus has also been introduced. Various attachments to the AT bus have also become common for allowing peripherals, including disk drives, to more efficiently couple to the AT bus. For example, the Integrated Drive Electronics (IDE) attachment to the AT bus has become a very common interface for attaching disk drives to the standardized AT bus and is commonly referred to as the ATA (for AT bus Attachment) standard. Similarly, an interface standard referred to as Enhanced IDE (EIDE) is used to couple disk drives in the host. Preferably, the disk drive is adapted to attach to the host I/O bus via an EIDE connector. Alternatively, connection 52 may be implemented for connecting directly to a host I/O bus.

Alternative disk drive embodiments may conform to other interface specifications and appropriate other connections may be employed. Such alternate interfaces include the Small Computer Standard Interface (SCSI), the Serial SCSI Architecture (SSA) interface, the P1394 interface, the Fiber-channel interface, and the parallel printer port interface. Each of numerous embodiments of a disk drive in accordance with the present invention can be compatible with at least one of the above-noted alternate interfaces, or other suitable interfaces, used by the host.

Overview of Built-In Self Test (BIST)

Microprocessor 34 executes program code to control the initiation and overall execution of the BIST performed by the disk drive. BIST is preferably performed as part of routine testing of each disk drive in mass production manufacturing of disk drives. BIST can be initiated during power-up, by following a pre-determined schedule, or in response to a failure/degradation condition. Many different self tests can be executed as part of the BIST. One of the self-test features includes characterization, involving a dibit extraction approach, of nonlinear distortion of the readback signal attributable to ISI. The dibit extraction approach entails storing a maximal length pseudo-random number (PN) sequence, $\{p_n\}$, n=0, . . . , $M_p$-1, onto the recording surface of a disk 14, where $M_p=2^q-1$ is the length of a PN sequence defined over $GF(2^q)$, and $p_n$ is an element of $\{-1, +1\}$.

The cross-correlation between the readback signal and a reference PN sequence is then computed. Explicitly, $r_{px}(k)$, the coefficient corresponding to the $k^{th}$ time lag is computed in hardware according to the equation:

$$r_{px}(k) = \Sigma x_m p_{f(m)}$$

where $\{x(m)\}$ are the digital values of the readback samples; where $f(m)=(m+k) \mod M_p$; where the summation is taken from m=0 to $(NM_p)-1$; and where N is the number of times the maximal length PN sequence is repeated to provide an estimate of $r_{px}(k)$. The sequence of cross-correlation coefficients, $\{r_{px}(k)\}$, k=$-(M_p-1)/2$, . . . -1, 0, +1, . . . , $+(M_p-1)/2$, can be viewed as the samples of a waveform which contains a "main dibit" and a variety of echoes (smaller dibits) which appear at predictable and distinct offsets from the main dibit. The location of an echo determines the type of nonlinear interaction (overwrite, 1-bit shift, etc.), and the amplitude of the echo (relative to the main dibit) is an estimate of amount of nonlinear distortion caused by the particular nonlinearity. Because the location of the various echoes can be predicted and because only the amplitudes of echoes need be known, there is no practical need to determine $r_{px}(k)$ for all values of k. Instead, the information relating to only those values corresponding to the main dibit and the echoes need be calculated.

Once the nonlinear ISI has been characterized, any number of different procedures can be performed based on this information. One of the more useful procedures is to control the amount of write precompensation. There are various methods of tuning the precompensation in response to the nonlinear ISI measurements. In a first, open loop method, all the measurements and precompensation circuitry are pre-calibrated. An estimation of the ratio of the peak value of the echo relative to the main pulse is made. This ratio is then used to adjust the timing shift in units of T (the fundamental write clock period) for the precompensation value. Alternatively, a closed-loop, more time-consuming method, which relies less on calibration, can be implemented. With this second approach, the disk drive iteratively adjusts the write precompensation using an adjust-write-read sequence until the amplitude of the echo(s) have been reduced to zero or to a level which represents an acceptably small value of residual non-linear time shift. Both techniques can be applied to perform first order write precompensation (based on the first dibit echo) for correcting 1 T timing effects as well as second order, multi-level write precompensation (based on the second or successive dibit echoes) to perform a secondary correction of a prior 2T transition. Besides write precompensation, other types of applications which may advantageously apply the dibit extraction results include manufacturing grading or failure detection and analysis of completed drives. Examples of failure criteria are overwrite greater than a quality threshold, nonlinear amplitude loss greater than a quality threshold, and the main dibit width being greater than a quality threshold.

Figure 1:
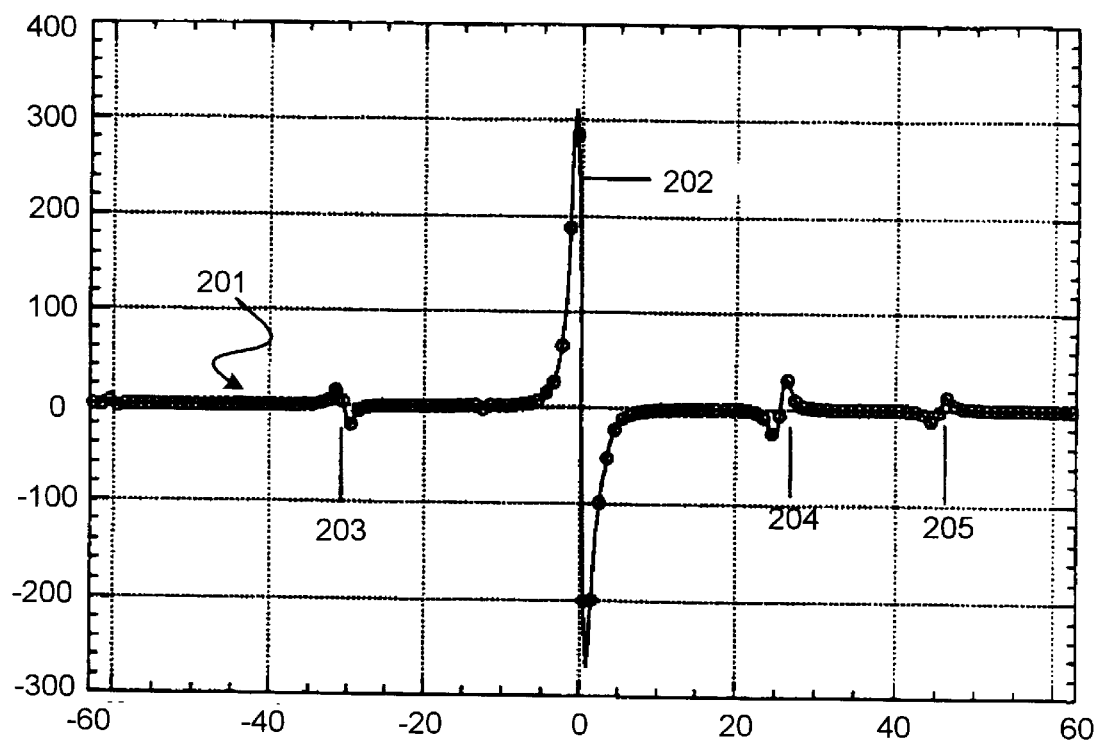
FIG. 1 is a graph showing a dibit extraction plot.

Only those sample points of the dibit waveform corresponding to the dibit echoes and possibly the main pulse are of practical interest in carrying out a BIST during mass production manufacturing. For example, referring back to FIG. 1, rather than calculating all 127 sample points (−63 to 0 to +63), only the four to five sample points corresponding to each of the three echoes 203–205 and perhaps ten sample points corresponding to the main dibit 202 are of interest. Owing to the mathematical properties inherent to cross-correlation and the PN sequence, echoes occur in predictable locations. More specifically, given a particular polynomial used to generate the PN sequence and the effect to be measured, the locations of interest can be calculated through Galois field theory or manually derived. (See the IDEMA paper). Once a sample location is determined, the exact PN sequence with the appropriate amount of offset or delay corresponding to that location can be generated because there is a direct one-to-one correspondence between each PN sequence and each sample point of the dibit extraction plot. The appropriate PN sequence with the desired amount of delay is generated by presetting a PN generator with a predetermined, programmably stored seed value. Each seed value presets the PN generator so that it generates a PN sequence with a known offset.

Circuitry for producing cross-correlation values

Figure 3:
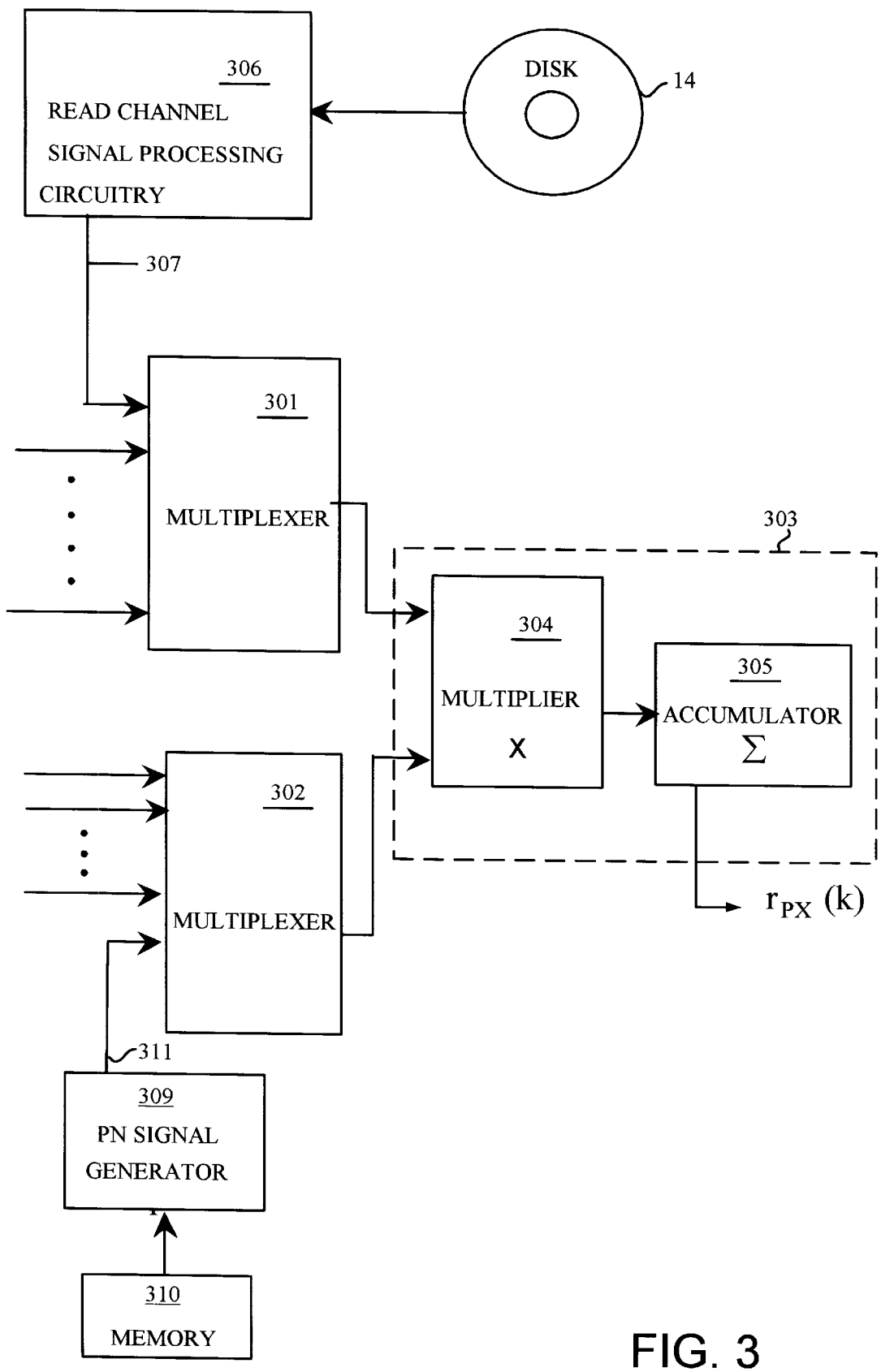
FIG. 3 is a block diagram of components in the hard disk drive that are used to perform dibit extraction as part of a test-read phase of a BIST.

With reference to FIG. 3, certain components of the hard disk drive preferably participate in a variety of operations including BIST operations described in detail herein. Although a dedicated test circuit can be implemented solely to perform dibit extraction, a more cost-effective approach entails utilizing the same circuitry as shared circuitry to perform a wide variety of different types of tests. More specifically, the dibit extraction can be performed by a channel quality measurement circuit which preferably is implemented as part of integrated-circuit channel chip 26. This same channel quality measurement circuit can be used to run other test algorithms and determine certain test metrics. These functions and tests are performed internally by the disk drive (under microprocessor control), without the need for external test equipment support.

The shared circuitry includes a multiplexor 301, a multiplexor 302, and a correlator 303. Each of multiplexor 301 and a multiplexor 302 has multiple inputs, an output connected to an input of correlator 303, and each propagates a signal from one of a selected one of its inputs to correlator 303 via its output. Each multiplexor effects the selection of the input signal under the control of microprocessor 34 (FIG. 2). Correlator 303 includes a multiplier 304 and an accumulator 305

In addition to the shared circuitry, the components shown in FIG. 3 include one of the disks 14 and structure shown as front-end read channel signal processing circuitry 306 which preferably includes circuitry performing functions such as preamplification, automatic gain control, bit synchronization, sampling and analog-to digital ("A/D") conversion. Circuitry 306 supplies a signal 307 to one of the inputs of multiplexor 301. Signal 307 preferably is a multi-bit signal derived from sampling and A/D converting the readback signal obtained by reading disk 14. Suitably, signal 307 has a format involving 6-bit groups representing decimal values in a range from −32 to 0 to 1 to +31 (a total of 64 different values).

The components shown in FIG. 3 also include a signal generator 309 and a memory 310. Signal generator 309 generates a reference signal 311 and supplies it to one of the inputs of multiplexor 302. Suitably, reference signal 311 has a format involving 6-bit digital groups coded to represent one of two possible decimal values: either −16 or +16.

Preferably, signal generator 309 operates under control of microprocessor 34 during a test-write phase of the BIST to cause a codeword to be written repeatedly on a recording surface of disk 14. Each codeword constitutes a recorded string of bits defining a phase of a maximal-length psuedo-random sequence generated by a predetermined polynomial. The recorded codewords as concatenated form a recorded block in which each recorded codeword preferably has the same phase.

During a test-read phase of the BIST, memory 310 preferably operates under of microprocessor 34 to supply a sequence of seed values to signal generator 309 so that signal generator 309 generates reference signal 311 to define a sequential block including multiple codewords such that multiple phase differences exist between the multiple recorded codewords and the multiple sequential codewords.

In summary of the foregoing description of the test-read phase, a readback signal, responsive to the PN sequence stored on disk 14, is selected by multiplexer 301 for input to multiplier 304. The readback signal consists of noise and distortion-influenced samples with nominal values (e.g., any decimal values within a range covered by 6 bits). While multiplexer 301 is so operating, multiplexer 302 selects signal 311 supplied by signal generator 309 and supplies it to multiplier 304. Multiplier 304 and accumulator 305 operate during the test-read phase to cross-correlate each recorded codeword defined in the readback signal and each sequential codeword defined signal 311. Preferably, signal generator 309 is initialized with appropriate offsets that correspond to sample points where an echo is expected to occur. For example, the center of the echo of interest for the dibit waveform shown in FIG. 1, occurs at approximately 25 samples from the main dibit. Preferably, to determine the amplitude of this echo, the BIST takes several samples in the vicinity of the offset of 25. Instead of developing cross-correlation values for every phase shift (e.g., −63 to +63= 127 samples), only the PN sequences corresponding to the locations of an expected echo peak are generated.

The appropriate amounts of offsets corresponding to the expected echo locations are stored in memory 310 in the form of seed values. A sample from any desired location may be found by instructing the microprocessor to load a different seed value (corresponding to a codeword or bit pattern) into memory 310. Often, the offsets between the cross-correlation inputs can become quite large. For example, in a commonly used PN sequence generated by the polynomial $x^6+x^5+x^2+1$, echoes of interest occur at shifts of −29 samples. As another example, in another PN sequence generated by the polynomial $x^6+x+1$, echoes of interest occur at shifts of 8 samples, etc. In one embodiment, the offset can be accomplished by presetting generator 309 with a seed value, such that the starting state for the generated PN sequence has the desired offset. Thus, any offset (positive or negative) of the PN sequence relative to the readback signal can be obtained by loading the PN signal generator with the correct seed value. The PN signal generator 309 is iteratively run with different seed values in order to derive the full shape of an echo. For achieving improved results, different techniques may be used to better estimate the peak. The particular technique chosen depends on the specific application to which is to be applied. Some examples include interpolation (according to 1st, 2nd, 3rd, etc. order polynomials), curve filling, spline curve fitting, application of a Lorenzian function, etc.

The actual cross-correlation function is performed as follows. The ideal PN sequence from PN signal generator 309 is selected by multiplexer 302 and input to correlator 303. The readback signal supplied to multiplexer 301 may come from anywhere in the signal path of the read channel, up to the detector. The preferred embodiment is to use the input to the FIR equalizer so that the delay of the FIR equalizer can be adjusted to give a delay vernier to the sample phase. Otherwise, the output from the FIR equalizer is equally acceptable. The two signals from multiplexers 301 and 302 are then multiplied by multiplier 304. Accumulator 305 sums the results, which is temporarily stored. The correlator 303 comprises the combination of the multiplier 304, followed by the accumulator 305. This cross-correlation process is repeated on a point-by-point basis, and the results are read at the end of a sector. By examining the maximum amplitude of the echo samples, this provides a means for characterizing the amount and type of nonlinearity present in each head/disk/zone combination. Measurements can also be taken at any location on the surface of any given head/disk/zone. Furthermore, as part of the read/write channel circuitry, an embodiment of this invention may be used to optimize the drive parameters automatically for each head/disk/zone combination.

Suitable implementing structure for PN generator

Figure 4:
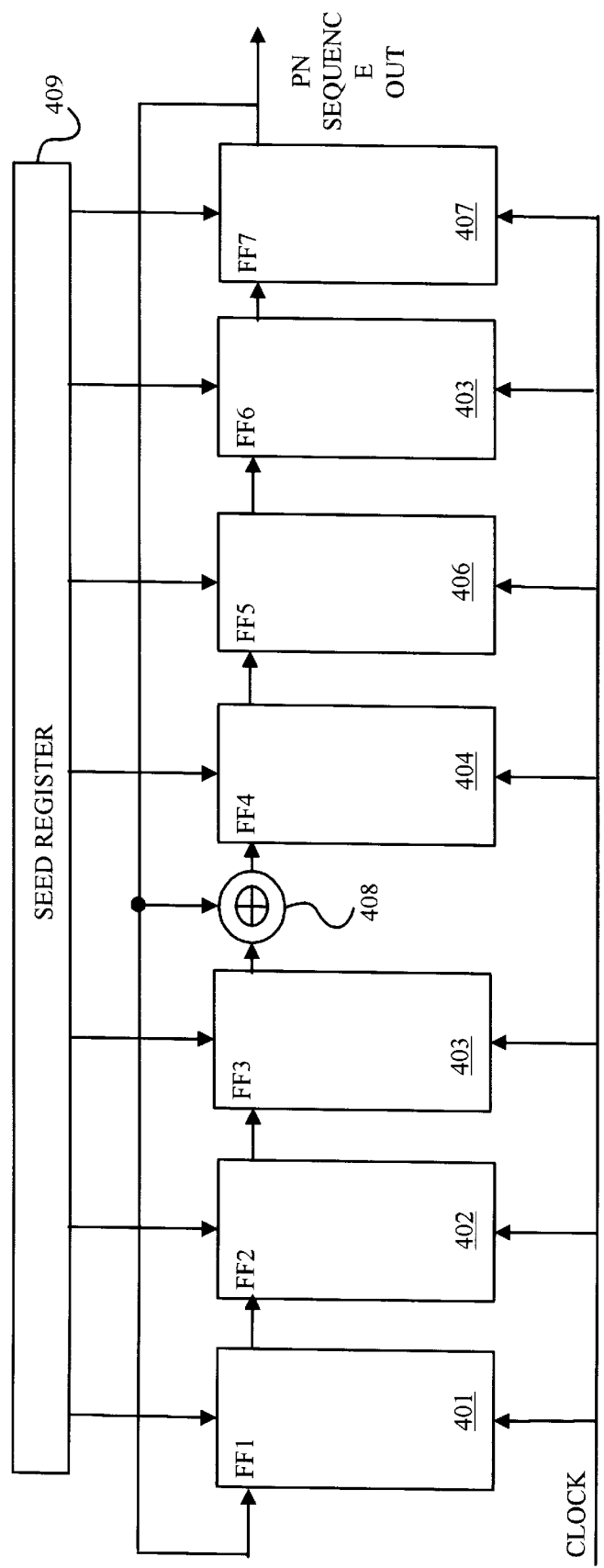
FIG. 4 shows an example of a pseudo-random number generator circuit.

With reference to FIG. 4, a suitable pseudo-random number generator circuit for implementing generator 309 is shown connected to seed register 409. The suitable circuit has a linear feedback shift register configuration. It is also commonly referred to as a polynomial division circuit because the feedback position is characterized by a polynomial. The repetition rate (e.g., the number of samples before the PN sequence starts repeating) for such a circuit is defined as $2^N-1$, where N is the number of shift registers implemented. In the example shown, seven shift stages 401–407 are coupled together in series. Hence, N equals seven, which yields $2^7-1=127$ or a 127-bit sequence. However, in other embodiments, there may be more or fewer shift stages with taps. Basically, the output from stage 401 is input to register 402. The output from stage 402 is input to register 403. The output from stage 403 is input to Exclusive-OR gate 408. Exclusive-OR gate 408 adds (mod 2) the outputs from stages 403 and 407 and inputs the result into stage 404. The output from stage 404 is input to register 405; the output from stage 405 is input to stage 406; the output from stage 406 is input to stage 407; and the output from stage 407 is fed back as an input to stage 401. The output from stage 407 gives the PN sequence.

The seven stages 401–407 of the PN generator are preset with a 7-bit seed value. This determines the starting position within the repeating maximal length PN sequence; in other words, it determines the phase of the PN sequence to be generated. There is a direct mapping between the 7-bit seed loaded into the registers and the particular starting position in the PN sequence and ultimately, the sample point with respect to the dibit waveform. As discussed above, the microprocessor programs one or more seed values into memory (e.g., seed register 409), which corresponds to the requisite offsets when loaded into the registers 401–407 of the PN generator. Each seed value that the PN generator is preset to, will point to a different starting point of the PN sequence, which corresponds to a different offset. In this example, the preferred polynomial is given by: $P(X)=x^7+x^3+1$. Loading the seven shift stage 401–407 with a seed value of 1000000 produces the following PN sequence:
0000001000100110001011101011011000001100110101 0011100111101101000010101011110101001010001101 11000111111100001110111100101011001001.

Different seed values will generate the same PN sequence of bits, but starting in a different location (offset). However, an alternative polynomial (e.g., $P(X)=x^7+x^3+x^2+x^1+1$) will generate a different 127-bit sequence.

The PN generator is preset with the pre-programmed seed value when a sync signal is detected. In general, the format for reading data from a disk includes a preamble which is typically an all "1's" pattern used by the phase-lock-loop circuit to perform bit timing synchronization functions. The preamble is followed by a sync word used to determine the start of data, sometimes called "framing." The actual data comes after the sync word. When this sync word is detected, the PN generator is preset with the appropriate seed value and generates a PN sequence with the appropriate offset. This ideal, reference PN sequence is used in the correlation process described above to determine one specific sample point of the dibit extraction plot.

Figure 5:
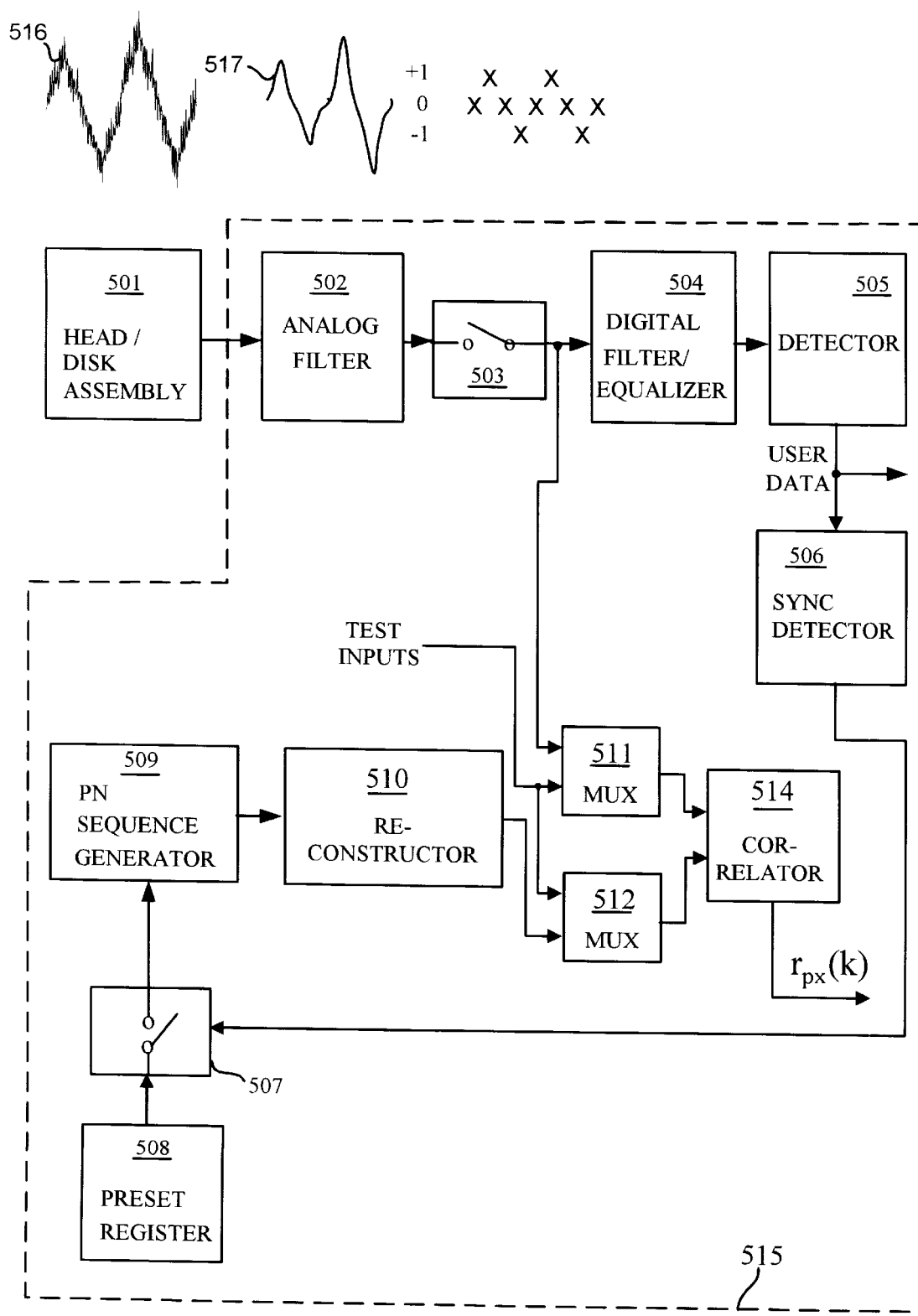
FIG. 5 shows a block diagram of a single chip residing within a hard disk drive upon which dibit extraction may be performed according to the present invention.

FIG. 5 shows a block diagram of a single chip residing within a hard disk drive upon which dibit extraction may be performed according to the present invention. The circuitry associated with all of the block 502–513 are fabricated upon a single semiconductor chip 515. The readback signal 516 from the head/disk assembly 501 is responsive to the PN sequence stored on the disk and contains a high degree of noise. An AGC/analog filter 502 is used to provide automatic gain control and to filter out some of the noise and may provide some or all of the required equalization. The resultant filtered HDA readback signal is shown as 517. A circuit 503 periodically samples the amplitude of the signal, holds the sample temporarily, and converts it to digital format. It effectively quantizes the HDA signal. A digital filter/equalizer 504 is implemented to provide further filtering capabilities and to force samples to be clustered about their ideal values. A detector 505 detects the preamble, sync, and data. The user data are then sent out to the host computer.

When the sync byte is detected by the sync detector block 506, a sync detected signal is sent to activate switch 507. The function of switch 507 can be achieved by applying the sync detected signal to the load input to the PN generator. In turn, this causes the seed value stored in preset register 508 to be loaded into the pseudo-random sequence generator 509. PN generator 509 generates the representative PN sequence with the appropriate amount of delay corresponding to the sample of interest. Thereupon, a reconstructor circuit 510 converts the binary PN sequence to a digital representation of (−1,+1). The readback signal from the sample/hold block 503 is then selected by multiplexer 511 to be sent on to correlator 514. Similarly, multiplexer 512 selects the ideal PN sequence from the reconstructor to be sent on to correlator 514. Correlator 514 performs a cross-correlation between the readback signal and the representative two-level PN sequence to produce the $r_{px}(k)$ which is written into memory for further processing by microprocessor 34. To better define this amplitude, an averaging process may be performed. This averaging process may be interatively repeated using a fixed seed into the reference PN generator. Additional iterations with different seeds will help define the shape of each echo and/or dibit of interest in the time lag dimension.

To adjust write precompensation, two methods may be used. The preferred, closed-loop approach to tuning the precompensation is to choose a lag time representative of the amplitude of an echo and iteratively minimize the response at that lag time by a sequence of:
 a) measuring the amplitude of the echo (with or without averaging and curve filling as described earlier),
 b) setting a new value into the precompensation circuit, the magnitude and direction determined by measurement in (a), in accordance with well known minimization techniques
 c) re-writing the PN sequence with a new value of precompensation
 d) looping back to (a) until the measurement indicates that the nonlinear timing shift is sufficiently small.

In the alternative, open-loop method of tuning the write precompensation circuit, the amplitude corresponding to an echo peak is normalized to the main response and is sent to the write precompensation circuit as a calibrated fraction of the clocking interval, T.

In both cases, it is the objective to perform write precompensation so as to minimize the nonlinear ISI for that particular head/surface/zone combination. In the above descriptions, one echo was used to indicate the one-bit, or closest spacing interaction. It is known in the art to use multi-level write precompensation to mitigate both one bit and two bit spacing interactions. This is accomplished in the same manner as described above, by examining a number of echoes describing the set of bit interactions which are of interest. For example, in FIG. 2, there are presented an echo representative of 1-bit-spacing (204 of FIG. 2) and representative of 2-bit-spaced interactions (205 of FIG. 2).

In addition to the tuning of write precompensation, other nonlinearities may be measured and corrective actions may be taken by use of this technique. These BIST measurements and responses may take place in the field or in the factory. An example of such a measurement is overwrite (echo 204 of FIG. 1). Corrective actions in response to this measurement might be modification of write current in the factory of field, or a decision to rework the head-disk assembly, for example, in a factory setting.

Figure 6:
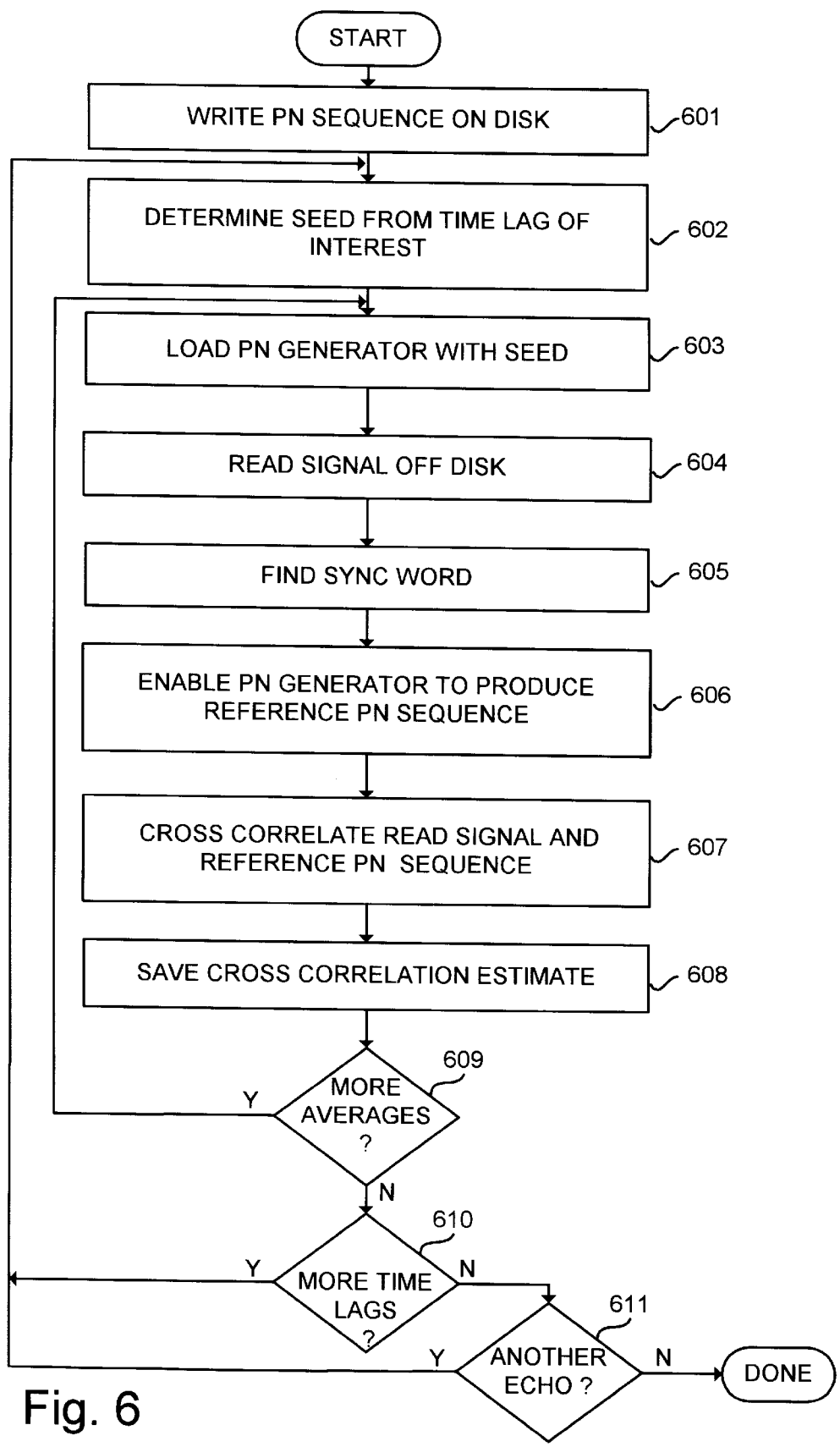
FIG. 6 is a flowchart describing the steps for characterizing nonlinear ISI through a built-in self-test (BIST) function of the hard disk drive.

FIG. 6 is a flowchart describing the steps for characterizing nonlinear ISI through a built-in self-test (BIST) function of the hard disk drive. Initially, step 601 generates a PN sequence which is subsequently written onto the disk. A seed corresponding to the time lag of interest is determined in step 602. The seed is then loaded into the PN generator, step 603. A signal responsive to the PN sequence that was written to the disk is readback, step 604. Upon detection of the sync word associated with the readback signal, step 605, the PN generator is enabled to produce an ideal, reference PN sequence, step 606. Thereupon, this reference PN signal is cross-correlated with the readback signal, step 607. The resultant cross-correlation estimate is temporarily stored, step 608. A determination is made in step 609 as to whether a more accurate determination of the amplitude at that sample point is needed. If a more accurate representation is needed, steps 602–608 are repeated with the amplitude results of each iteration being averaged together. Other sample points corresponding to that echo or dibit can be determined by implementing additional time lags, step 610. For each additional time lag, steps 602–609 are performed. Once the echo has been sufficiently characterized, other echoes can similarly be characterized by step 611. For each echo, steps 602–610 are executed. Once all echoes and/or dibits have been characterized, the process is done.

Figure 7A:
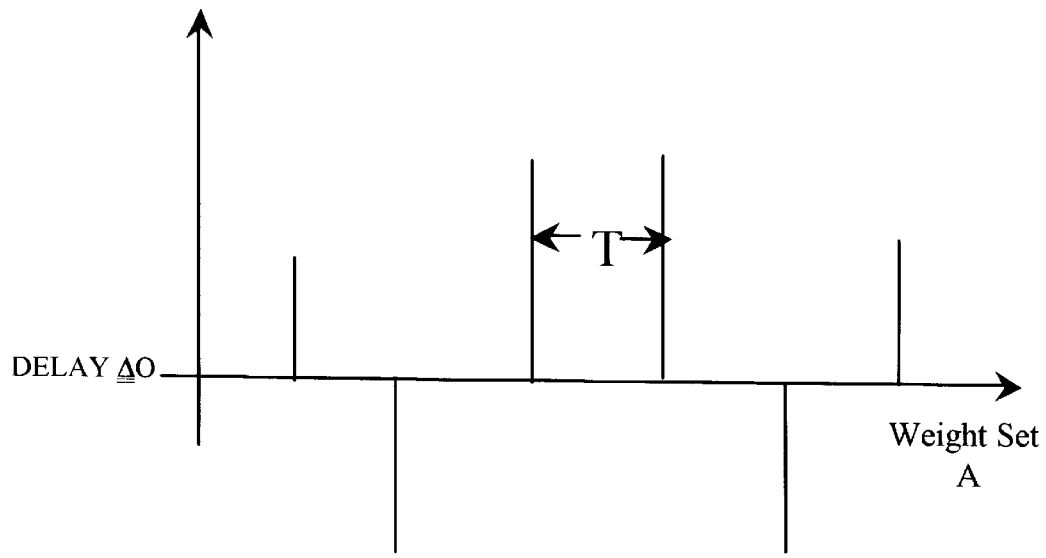
FIG. 7A is a graph showing a digital filter/equalizer weight set A having no delay.
Figure 7B:
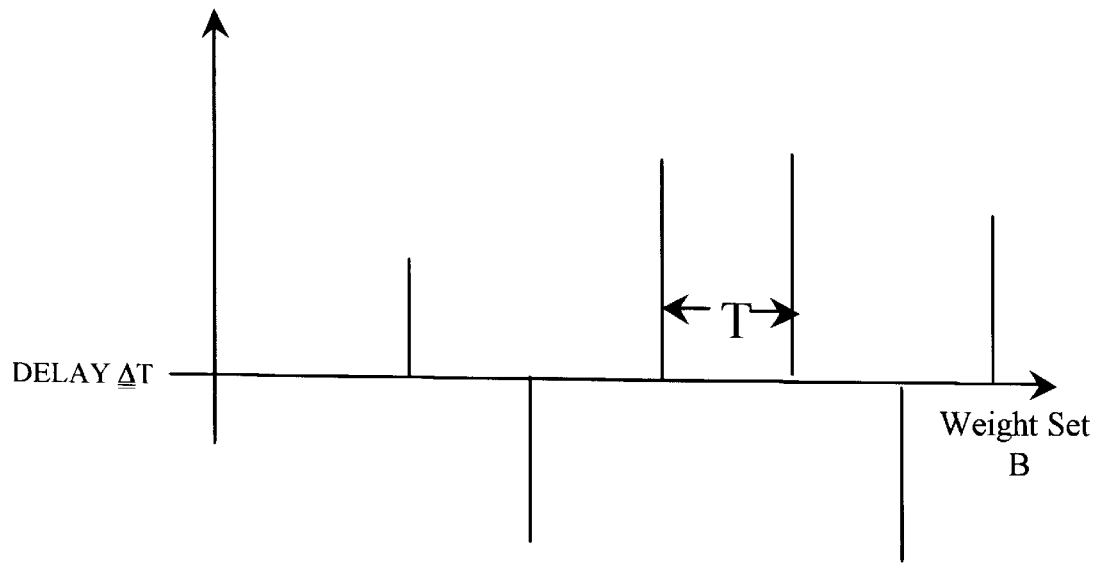
FIG. 7B is a graph of a digital filter/equalizer weight set B having a delay approximately equal to the channel spacing.
Figure 7C:
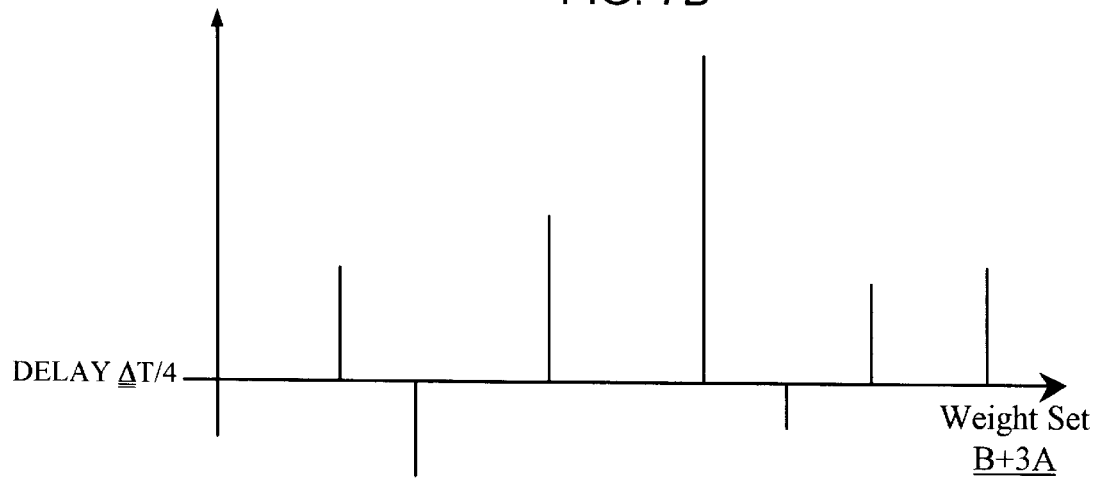
FIG. 7C is a graph of a digital filter/equalizer weight set of (B+3A)/4 having a delay of approximately one-quarter of the channel spacing.

In the preferred embodiment, the resolution of the cross-correlation can be improved beyond the channel sample spacing, T. An improved resolution can be obtained by implementing fractional-T shifts. This is achieved by setting the tap weights of the FIR filter and equalizer to be such that the frequency response remains constant with successive tests. However, the delay through the filter is sequenced in small steps. It should be noted that depending on other system uses of the FIR filter input, commensurate provisions for compensating for this delay might be required. FIGS. 7A–C graphically illustrate various delays through an FIR filter for achieving greater cross-correlation resolution. In FIG. 7A, a digital filter/equalizer weight set A having no delay is shown. FIG. 7B shows the digital filter/equalizer weight set B having a delay of approximately T. In FIG. 7C, a digital filter/equalizer weight set of (B+3A)/4 is shown having a delay of T/4. It is appreciated by observing the impulse response that a linear combination of digital filter/equalizer weight sets A and B approximates the same transfer function with interpolated delay. This allows the signal input (x) of the filter to be delay shifted in fractional-T amounts relative to the filter output. In turn, the filter output timing determines the system clock timing and therefore, the PN sequence timing. It will be appreciated by those skilled in the art that the explanation of FIG. 7, describing the delay adjustment, will not result in exactly the same amplitude transfer function at all delays. There are known methods of FIR filter design which may be applied (e.g., using least squares approximation) to more accurately control the amplitude response as the delay response is modified.

Figure 8:
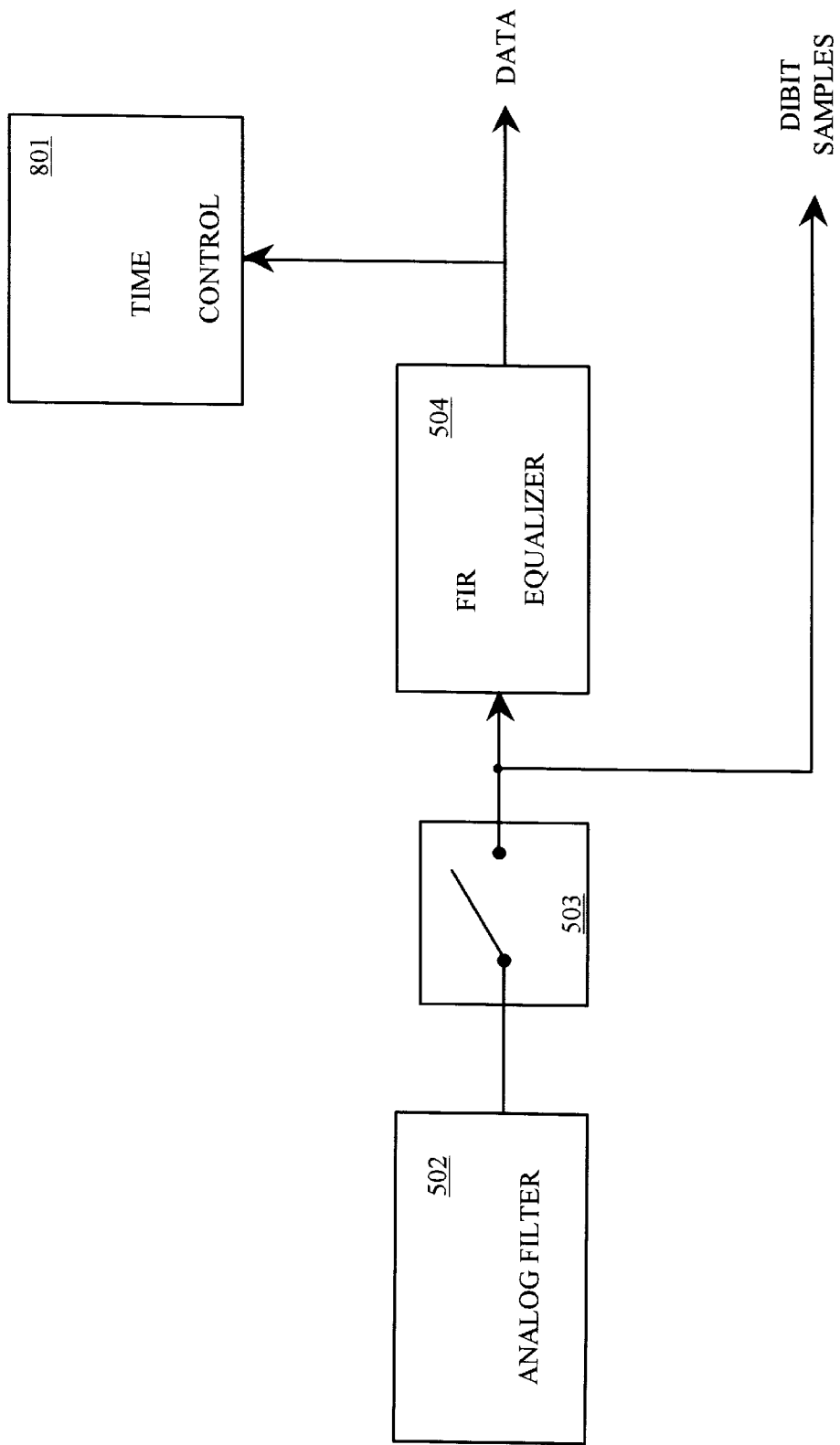
FIG. 8 shows a block diagram of simulated oversampling circuit used to achieve greater cross-correlation resolution.

FIG. 8 shows a block diagram of simulated oversampling circuit used to achieve greater cross-correlation resolution. The error signal for the timing loop of time control circuit 801 is derived from the output of the FIR filter and equalizer 504. By appropriately adjusting the filter tap weights of FIR filter and equalizer 504, one can effectively change the sample phase at the input to the FIR filter. The output from the time control circuit 801 is used to control the rate of sampling by sample and hold circuit 503. The dibit samples are extracted using the FIR filter input samples. Hence, one can effectively oversample the FIR filter input sequence by changing the tap weights on multiple reads.

We claim:

1. A hard disk drive providing a built-in self-test for measuring non-linear distortion of a readback signal through dibit extraction, the hard disk drive comprising:

a disk having a recording surface storing a recorded block including a recorded string of bits defining a first phase of a maximal length pseudo-random sequence generated by a predetermined polynomial;

head and read channel for producing the readback signal responsive to the recorded block;

built-in self-test circuit operative during the self test including:

a signal generator for generating a reference signal having a sequential block including a sequential string of bits defining a second phase of the maximal length pseudo-random sequence;

a correlator responsive to the readback signal and the reference signal for producing a plurality of cross-correlation values representing part of a dibit extraction signal;

a programmable resister for storing a seed value for controlling the phase of the sequential string of bits; and a controller for programming the register with a plurality of different seed values corresponding to locations of dibit echoes in the dibit extraction signal.

2. The hard disk drive of claim 1, wherein the recorded block includes multiple recorded strings, the sequential block includes multiple sequential strings, multiple phase differences exist between the recorded strings and the sequential strings, and wherein the correlator produces multiple cross-correlation values.

3. The hard disk drive of claim 1, wherein the correlator includes a multiplier and an accumulator.

4. The hard disk drive of claim 1, wherein the head and channel means includes circuit means for producing an analog read signal, and circuit means including a sampler responsive to the analog read signal for producing a sampled signal, and wherein the correlator includes a multiplier responsive to the sampled signal.

5. The hard disk of claim 1, wherein the controller comprises a programmable microprocessor, and memory for storing a program, the microprocessor being responsive to the program to define a normal mode of operation and a built-in test mode of operation.

6. The hard disk drive of claim 5, wherein the built-in test mode of operation includes a test-write phase and a test-read phase, the hard disk drive further including means operative during the test-write phase for causing the signal-generating means to generate a block that is written to the disk recording surface, and means operative during the read-test phase for causing the signal-generating means to generate a sequential block including multiple cycles of the maximal length pseudo-random sequence, the multiple cycles having multiple phases.

7. A semiconductor chip having a circuit for operating during a built-in self-test of a disk drive to measure nonlinear distortion of a readback signal through dibit extraction, the circuit comprising:

a programmable register for storing a seed value;

a signal generator for generating a maximal length pseudo-random sequence;

the signal generator being responsive to the seed value to initiate the maximal length pseudo-random sequence at a phase corresponding to the seed value;

a correlator coupled to receive the readback signal and coupled to the signal generator for performing a cross-correlation between the readback signal and the pseudo-random sequence generated by the signal generator to generate a dibit extraction signal; and a controller for programming the register with a plurality of different seed values corresponding to locations of dibit echoes in the dibit extraction signal.

8. The semiconductor chip of claim 7, wherein the generator and correlator are included as part of a read channel circuit.

9. The semiconductor chip of claim 8, further comprising a filter having adjustable tap weights for adjusting a delay resolution in the cross-correlation values as a fractional channel sample spacing.

10. The semiconductor chip of claim 7, further comprising a synchronization detector for detecting a sync pattern read from the disk, wherein the generator is initialized with the seed upon detection of the sync pattern.

11. The semiconductor chip of claim 7, wherein a plurality of amplitudes are averaged for each sample point.

12. A hard disk drive providing a built-in self-test for measuring non-linear distortion of a readback signal through dibit extraction, the hard disk drive comprising:

a disk having a recording surface storing a recorded block including a recorded string of bits defining a first phase of a maximal length pseudo-random sequence generated by a predetermined polynomial;

head for producing the readback signal responsive to the recorded block;

a sampling device for sampling the readback signal at a channel sample rate to generate a sequence of signal samples;

built-in self-test circuit operative during the self test including:

a signal generator for generating a reference signal having a sequential block including a sequential string of bits defining a second phase of the maximal length pseudo-random sequence;

a correlator responsive to the sequence of signal samples and the reference signal for producing a plurality of cross-correlation values representing at least part of a dibit extraction signal; and a filter having adjustable tap weights for adjusting a delay resolution in the cross-correlation values as a fraction of the channel sample rate.

13. The disk drive of claim 12, further comprising a timing control circuit for generating a clock for clocking operation of the signal generator, wherein:

the filter filters the sequence of signal samples to generate a sequence of filtered signal samples; and the timing control circuit is responsive to the filtered signal samples.

14. The disk drive of claim 12, further comprising:

a programmable register for storing a seed value for controlling the phase of the sequential string of bits; and a controller for programming the register with a plurality of different seed values corresponding to locations of dibit echoes in the dibit extraction signal.

* * * * *